United States Patent

[11] 3,603,058

| [72] | Inventor | Bernhard Schubert |
| | | Neubornsen B. Hamburg, Germany |
| [21] | Appl. No. | 756,221 |
| [22] | Filed | Aug. 29, 1968 |
| [45] | Patented | Sept. 7, 1971 |
| [73] | Assignee | Hauni-Werke Korber & Co. K.G. |
| | | Hamburg-Bergedorf, Germany |
| [32] | Priority | Sept. 5, 1967, Sept. 11, 1967 |
| [33] | | Great Britain |
| [31] | | 40466/67 and 51345/67 |

[54] METHOD AND APPARATUS FOR THE PRODUCTION OF COMPOSITE FILTER TIPS
39 Claims, 15 Drawing Figs.

[52] U.S. Cl. .................................................. 53/126,
53/284, 93/1 C, 93/58 P, 93/77 FT
[51] Int. Cl. ......................................................... B31b 43/00,
B65b 1/22, B65b 5/10
[50] Field of Search ........................................ 93/1 C, 1
WZ, 55.1, 77 FT, 58 P; 53/126, 284, 1.1

[56] References Cited
UNITED STATES PATENTS

| 2,920,430 | 1/1960 | Skinker | 53/126 |
| 3,238,699 | 3/1966 | Morton | 53/284 X |
| 3,354,887 | 11/1967 | Hall | 93/1 |
| 3,361,138 | 1/1968 | Metzinger | 93/1 |
| 3,362,413 | 1/1968 | Redford | 93/1 |
| 3,367,245 | 2/1968 | Wisdom | 93/1 |
| 3,370,514 | 2/1968 | Rome | 93/1 |
| 3,465,493 | 9/1969 | Sandy | 53/284 X |
| 3,513,626 | 5/1970 | Zhavoronkova | 53/126 X |
| 2,847,086 | 8/1958 | Muller | 93/58 |

Primary Examiner—Wayne A. Morse, Jr.
Attorney—Michael S. Striker

ABSTRACT: A filter tip which contains at least one charge of granular filter material is produced by moving a prefabricated upright tube sideways and introducing seriatim into the tube a first section of a filter plug, a charge of granular filter material, and a second section of the filter plug. The charge is formed immediately prior to introduction into the tube in a metering chamber which is adjacent to the upper end of the tube, and the first section is severed from the filter plug immediately prior to introduction through the upper end of the tube. The charge can be introduced in a current of air and/or by gravity.

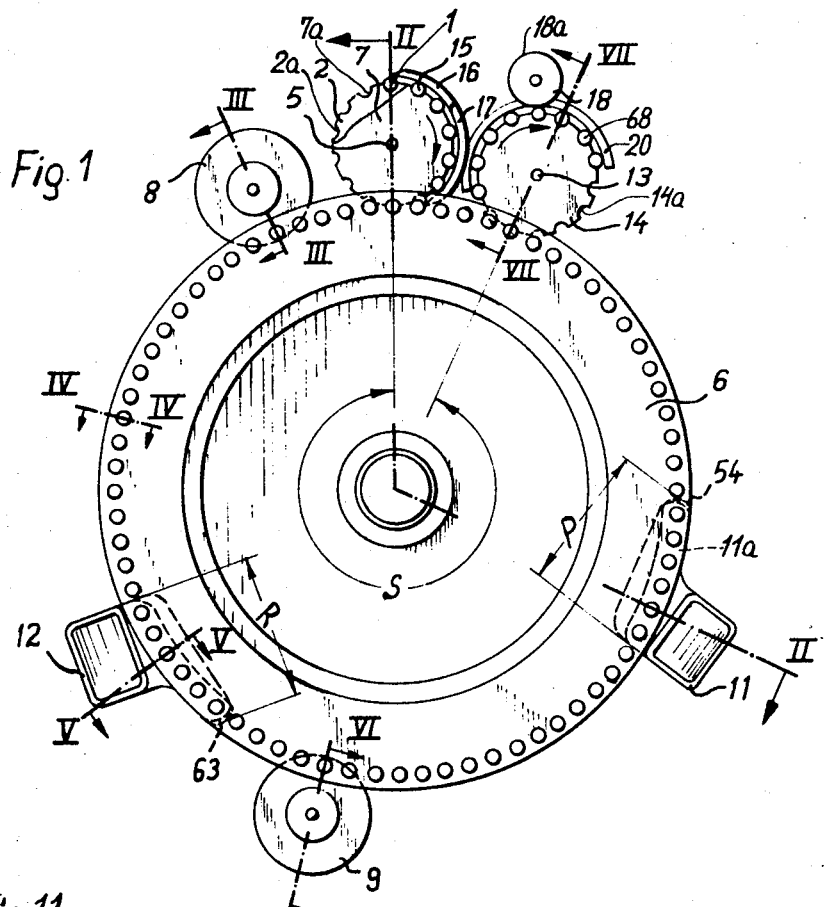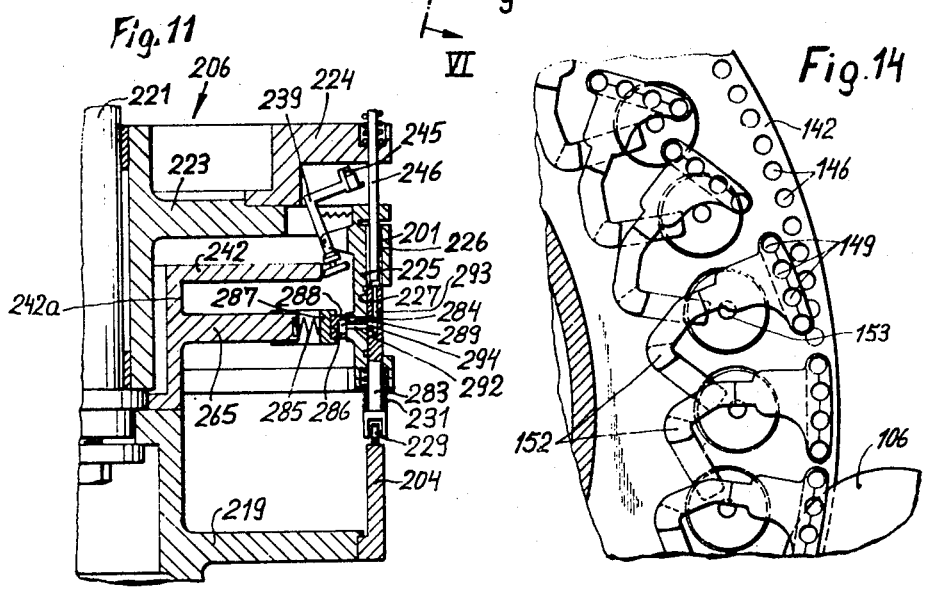

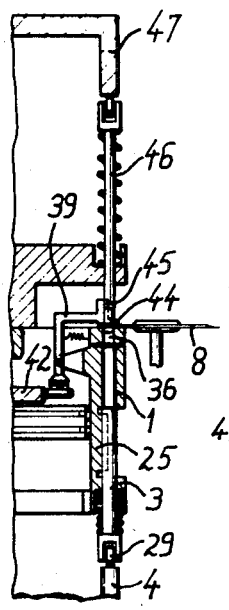
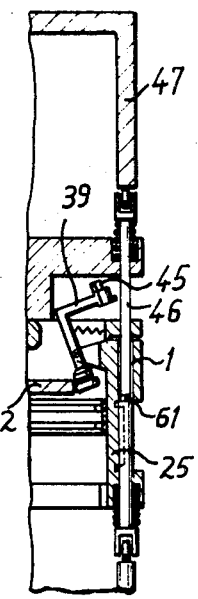
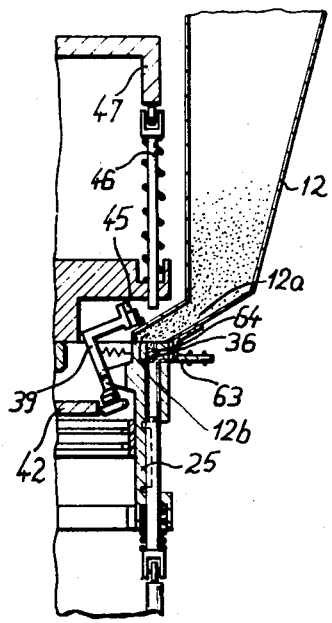
Fig. 3    Fig. 4    Fig. 5
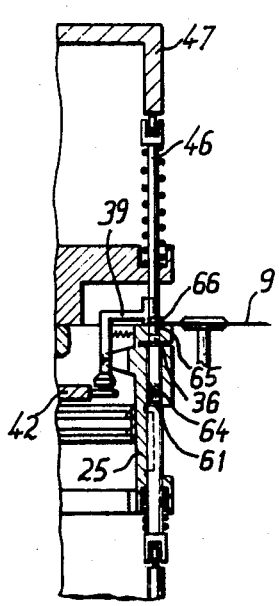
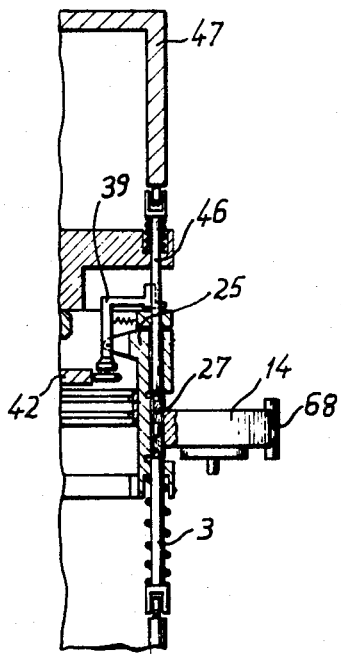
Fig. 6    Fig. 7

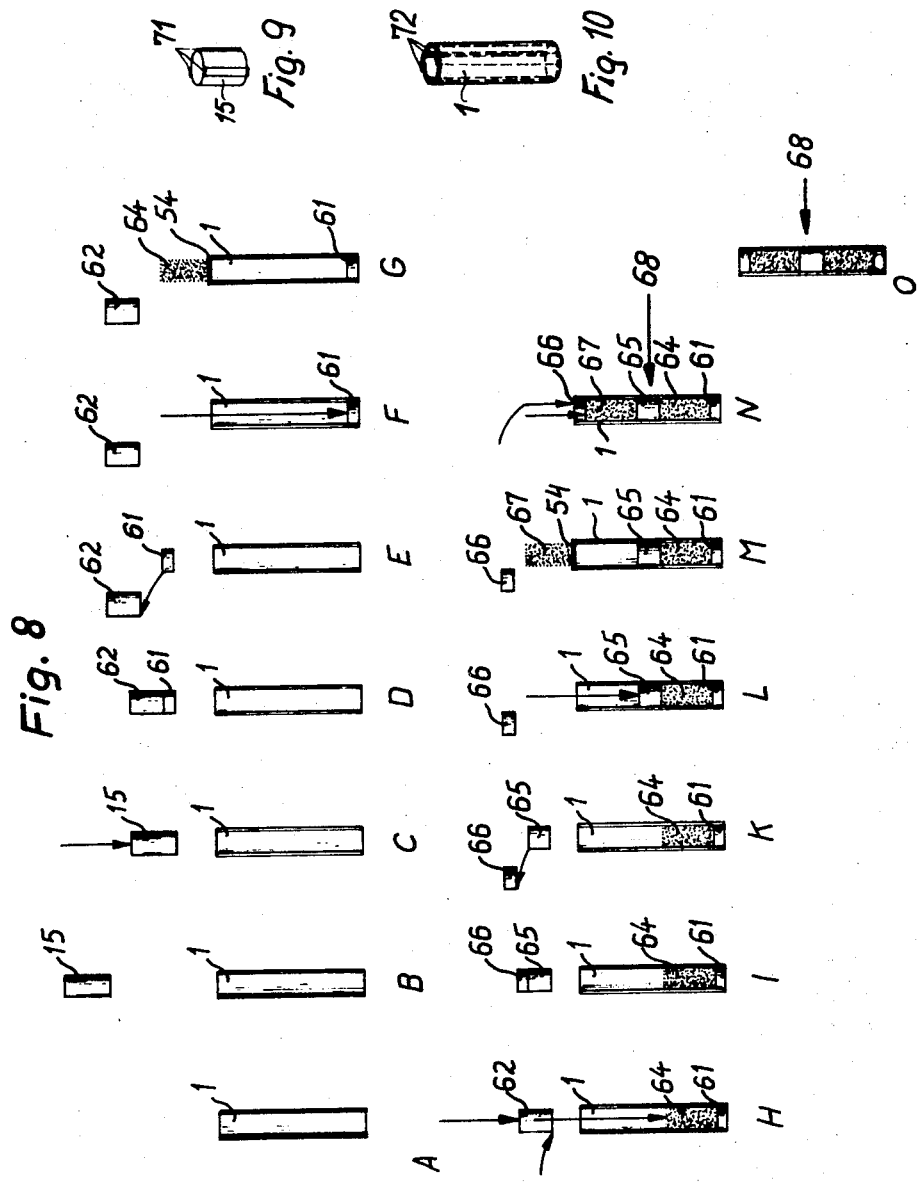

INVENTOR
Bernhard Schubert

BY Michael S. Striker
ATTORNEY

METHOD AND APPARATUS FOR THE PRODUCTION OF COMPOSITE FILTER TIPS

BACKGROUND OF THE INVENTION

The present invention relates to a method and apparatus for the production of composite filter tips, and more particularly to an improved method and apparatus for the production of filter tips wherein a tube contains at least one charge of flowable granular or pulverulent filter material flanked by two filter plug sections of acetate, formed plastic or like air permeable solid material. Such filter tips are used in filter cigarettes, filter cigars or filter cigarillos.

In the manufacture of filter tips for cigarettes or other tobacco-containing products, the composition of the filter tip must be such that the material of the filter intercepts substantial amounts of tar without, however, affecting the taste. This can be achieved by introducing into filter tips charges of granular or powdery material. Manufacture of filter tips which contain loose granular material is more complicated than the production of filter tips which contain self-sustaining wads or plugs of fibrous entrainment-type filter material; however, it was found that certain substances which are particularly beneficial in filter tips can only be produced in granular form, either in the form of a finely comminuted powder or in coarse or medium particle size. Care must be taken to insure that the contents of a filter tip offer to the passage of tobacco smoke a substantially uniform resistance, that the smoke should contact a large area of each granule, and that the resistance to the flow of smoke is not excessive.

U.S. Pat. No. 3,308,832 to Stelzer et al., discloses a method of producing filter tips or filter mouthpieces which contains granular material. Filter plug sections are aligned at longitudinally spaced intervals to define between themselves gaps which are converted into open-sided pockets when the thus aligned sections are partially convoluted into wrapping material. Charges of granular material are admitted into the pockets while the sections travel sideways, and the wrapping material is thereupon converted into a tube which surrounds the sections and seals the charges of granular material between the sections. This method is quite satisfactory when the quantities of granular material in all pockets need not be identical and when the granular material need not completely fill the spaces between the filter plug sections. If the quantity of granular material in a pocket is excessive, or is just sufficient to fill the pocket, the external surface of the finished filter tip is formed with a bulge. Therefore, the pockets are normally filled slightly less than to capacity; this reduces the quality of the filter because tobacco smoke tends to find the path of least resistance and flows through the unoccupied part of the chamber which contains the granulate. Therefore, such methods is not entirely satisfactory for the production of filter tips wherein the quantity of granulate must be within a very narrow range, for example, in filter tips which contain a particular granulate known as Strickman filter.

U.S. Pat. No. 3,259,029 to Hall et al. discloses a method and apparatus for the production of a continuous filter rod. A web of wrapping material is fed lengthwise and the sections of a filter rod are fed onto the web to define between themselves compartments for reception of granulate. The web is converted into a U-shaped trough prior to admission of granulate and is thereupon converted into a tube which encloses the sections and the charges of granulate. The problems which arise in the production of such filter tips are the same as those of the Stelzer et al. method; i.e., it is difficult to insure uniform filling of compartments with granular filter material, mainly because the filter plug sections are likely to become displaced and to define between themselves compartments whose volume deviates from a desired volume.

British Pat. No. 1,034,306 discloses an apparatus wherein the granulate is fed into axially parallel bores of an intermittently rotated disk and is expelled from the bores by a plunger, together with a filter plug, to be thereupon wrapped into tape. A drawback of such apparatus is that it is difficult to properly relate the speed of intermittently advancing charges of granulate with the speed of continuously advancing wrapping tape. The output of such apparatus is low and subdivision of the continuous filter rod into discrete filter tips presents problems which are similar to those in the apparatus of Hall et al.

SUMMARY OF THE INVENTION

It is an object of my present invention to provide a novel and improved method of producing filter tips for use in filter cigarettes or the like according to which each of a succession of filter tips contains the same quantity of granular filter material and according to which the space occupied by such granular material in each of a series of successively produced filter tips is the same.

Another object of the invention is to provide a method of the just outlined character according to which filter tips which contain one or more charges of granular filter material can be produced at a high speed and which insures that the granulate is properly confined in the filter tips so that it cannot escape during assembly of filter tips with tobacco rods and/or during smoking.

A further object of the invention is to provide a method of producing filter tips which contain granulate confined between wads or similar inserts of entrainment-type filter material and wherein the wads are automatically bonded or otherwise secured to the encircling wrapping material.

Still another object of the invention is to provide a novel apparatus which can be utilized in the practice of the above outlined method and which is capable of producing filter tips containing one or more charges of granulate in an economical operation, in a small area, with a high degree of uniformity, and in a fully automatic way.

A concomitant object of the invention is to provide the apparatus with a novel assembly conveyor which can transport prefabricated components of filter tips along a relatively short path in which such components are assembled to form granulate-containing filter tips.

An ancillary object of the invention is to provide the apparatus with novel and improved feeds which supply to the assembly conveyor all components and ingredients which are necessary for the production of improved filter tips.

A further object of the invention is to provide novel filter tips which contain at least one charge of granular filter material and which are produced in accordance with the aforeoutlined method.

The method of my invention is employed in assembly of rodlike filter tips or filter mouthpieces of the type wherein at least one charge of granular filter material is confined in a tube between gas-permeable entrainment-type filters. The method comprises a first step of providing one end of a prefabricated tube with a first filter and leaving the other end of the tube open, a second step of introducing through the other end a charge of granular filter material, and a third step of introducing through the other end a second filter. The tube is preferably transported sideways, at least during introduction of the charge and of the second filter, and the second step is preferably preceded by or includes removing from a supply of granular filter material a measured amount of such material to form the charge, preferably in a zone which is immediately adjacent to the other end of the tube.

In order to enhance the output, several charges can be formed simultaneously and the thus obtained charges are introduced simultaneously into an equal number of tubes which travel sideways, preferably in such a way that their open ends face upwardly.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a top plan view of an apparatus which embodies one form of my invention and which is designed to produce filter tips of double unit length;

FIG. 3 is a fragmentary vertical sectional view on the line III—III of FIG. 1;

FIG. 4 is a similar fragmentary vertical sectional view on the line IV—IV of FIG. 1;

FIG. 5 is a fragmentary vertical sectional view on the line V—V of FIG. 1;

FIG. 6 is a fragmentary vertical sectional view on the line VI—VI of FIG. 1;

FIG. 7 is a fragmentary vertical sectional view on the line VII—VII of FIG. 1;

FIG. 8 illustrates the steps of assembling a filter tip in the apparatus of FIGS. 1–7;

FIG. 9 is a perspective view of a filter plug which can be utilized in the apparatus of FIGS. 1 to 7;

FIG. 10 is a perspective view of a tube which can be utilized in the apparatus of FIGS. 1 to 7;

FIG. 11 is a fragmentary axial sectional view of the assembly conveyor in a second apparatus;

FIG. 14 is a plan view of a detail in the apparatus of FIG. 12, substantially as seen in the direction of arrow XIV in FIG. 13.

DESCRIPTION OF THE PREFERRED EMBODIMENTS

Figure 2:
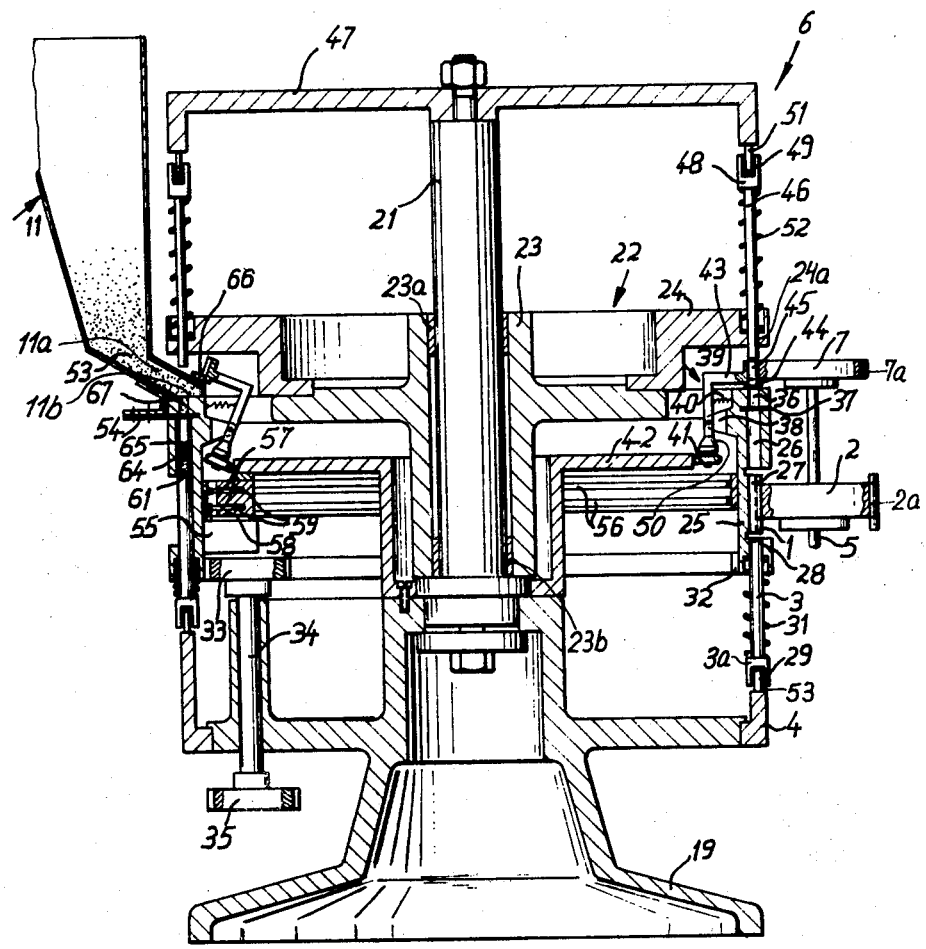
FIG. 2 is a vertical sectional view as seen in the direction of arrows from the line II—II of FIG. 1.

The apparatus which is illustrated in FIGS. 1 to 7 comprises a conveyor 6 for prefabricated tubes 1 consisting of mouthpiece paper or other suitable wrapping material. In accordance with a feature of the invention, the conveyor 6 simultaneously constitutes the assembly conveyor of the apparatus, namely, that main mobile element of the apparatus wherein the filtering components of filter tips or filter mouthpieces are introduced into successive prefabricated tubes 1 to form filter tips 68 of double unit length. The conveyor 6 is rotatable about a vertical axis defined by a fixed shaft 21 and cooperates with three feeds including a first feed for prefabricated tubes 1 which includes a rotary supply conveyor 2 here shown as a fluted drum or wheel which is rotatable about a vertical axis, a second feed for gas-permeable entrainment-type rodlike filter plugs 15 which includes a supply conveyor 7 here shown as a rotary fluted drum or wheel, and a third feed which includes two feeding units or magazines 11, 12 each of which contains a supply of granular or powdery filter material. The drums 2 and 7 are fixed to a vertical rotary shaft 5. The assembly conveyor 6 further cooperates with two subdividing or cutting devices including a first rotary disk-shaped cutter or knife 8 located downstream of the drums 2, 7, as considered in the direction of rotation of the assembly conveyor 6, and a second rotary disk-shaped knife or cutter 9 which is mounted between the feeding units 11, 12. The means for receiving or accepting finished filter tips 68 from the conveyor 6 comprises a takeoff conveyor in the form of a drum 14 which is rotatable about a vertical axis defined by a shaft 13. The path along which the upper ends of tubes 1 advance from the point of transfer onto the assembly conveyor 6 to the point of transfer of a finished filter tip 68 onto the drum 14 is indicated in FIG. 1 at S. The drums 2, 7 and 14 are provided with axially parallel equidistant peripheral flutes or pockets 2a, 7a, 14a which respectively accommodate tubes 1, filter plugs 15 and finished filter tips 68. Stationary shields or shrouds 16, 17 and 20 are respectively adjacent to the peripheries of the drums 2, 7 and 14 to hold the respective rodlike articles in their flutes. The takeoff drum 14 cooperates with a rotary heating element 18 whose peripheral surface 18a is heated by electric current and serves to exchange heat with finished filter tips 68 for the purpose which will be explained later.

The feeding units or magazines 11, 12 respectively comprise downwardly extending outlets 11a, 12a (FIGS. 2 and 5) provided with elongated discharge openings 11b, 12b which are disposed at a level directly above the path of upper ends of measuring or metering chamber 36 provided in the assembly conveyor 6. The regions where the outlets 11a, 12a respectively register with the metering chambers 36 are indicated at P and R (FIG. 1).

The details of the assembly conveyor 6 are illustrated in FIGS. 2 to 7. FIG. 2 further shows a portion of the feeding unit 11 and portions of the drums 2, 7. The aforementioned shaft 21 is mounted in a stationary base 19 and is secured thereto by one or more bolts or analogous fasteners. This shaft supports a rotary drum body 22 having a hub 23 surrounding the shaft 21 and being rotatable on two axially spaced antifriction bearings 23a, 23b. The drum body 22 further comprises an annular member 24 (hereinafter called cylinder) which is rigid or integral with the hub 23. The median part of the peripheral surface on the cylinder 25 is formed with equidistant axially parallel receptacles, each of which includes a flute 27 and a vertical bore 26 for tubes 1. The bores 26 are disposed above the corresponding flutes 27 but below the corresponding metering chambers 36. Each metering chamber 36 is separated from the upper end of the corresponding bore 26 by a narrow annular groove 37 which is machined into the peripheral surface of the cylinder 25. Two stationary sealing members or gates 54, 63 extend into the groove 37 in the regions P and R so as to close the metering chamber 36 from below during admission of granular filter material.

The cylinder 25 supports a set of discrete holding levers 39, one for each metering chamber 36. Each of these holding levers 39 has an upper arm 43 which is provided with a pocket 45 adapted to hold a portion of or an entire filter plug 15. Each holding lever 39 is movable between a first position (shown in the right-hand part of FIG. 2) in which its pocket 45 registers with the corresponding metering chamber 36 and a second position (shown in the left-hand part of FIG. 2) in which the pocket 45 is held inwardly and away from registry with such chamber. A ring 44 is provided on the cylinder 25 and surrounds the holding levers 39; it can cooperate with the pockets 45 to hold the plugs 15 in accurate alignment with the metering chambers 36. The levers 39 are pivotable in vertical planes which extend radially of the assembly conveyor 6 and each thereof is mounted in a radial slot 38 machined into the internal surface of the cylinder 25. The second arm 50 of each lever 39 carries a roller follower 41 which tracks the face of a stationary disk cam 42 rigidly secured to or integral with the base 19. A helical spring 40 operates between each holding lever 39 and the cylinder 25 to bias the respective follower 41 against the cam 42.

The drum 2 is mounted at the level of flutes 27 and the drum 7 is mounted at the level of pockets 45. The cylinder 25 is further formed with a set of vertical guide bores 28 which are located below and register with the flutes 27. Each of the guide bores 28 receives a portion of a vertically reciprocable supporting member or plunger 3 having a bifurcated lower end portion 3a defining a recess 53 for a roller follower 29 which tracks the face of a stationary ring-shaped cam 4 secured to the base 19. Helical expansion springs 31 bear against the end portions 3a and react against the underside of the cylinder 25 to maintain the followers 29 in engagement with the face of the cam 4.

The cylinder 25 supports an annular carrier 24 for a set of vertically reciprocable filter displacing members or rams 46.

The purpose of the rams 46 is to introduce sections or portions of filter plugs 15 into the tubes 1. It will be noted that each ram 46 registers with one of the metering chambers 36, and each of these rams has a bifurcated upper end portion 48 defining a recess 49 for a roller follower 51 which tracks the annular face of a stationary cam 47. Helical springs 52 bear against the end portions 48 and react against the top face of the carrier 24 to maintain the followers 51 in engagement with the face of the cam 47. The rams 46 extend through vertical bores 24a of the carrier 24. The cam 47 is secured to the shaft 21.

The drive means for rotating the drum body 22 includes an internal gear 32 at the lower end of the cylinder 25, a spur gear 33 mounted at the upper end of a shaft 34 and meshing with the gear 32, a second spur gear 35 at the lower end of the shaft 34, and a prime mover (not shown) which rotates the gear 35 at one or more speeds. The shaft 34 is journaled in a bearing sleeve of the base 19.

The cylinder 25 further supports an electrically operated agitator or shaker 55 of low amplitude. Two slip rings 56 are mounted in the cylinder 25 at a level above the agitator 55 and are connected with the latter by suitable conductors. Brushes 57 contact the slip rings 56 and are mounted in a housing 58 which is secured to the stationary cam 42. Springs 59 are mounted in the housing 58 to bias the brushes 57 against the respective sliprings 56. Each of the brushes 57 is connected to one pole of an energy source, not shown.

FIGS. 3 and 6 show that the rotary cutters 8, 9 are mounted in a plane which is directly adjacent to the top face of the cylinder 25. FIG. 5 shows that that the discharge opening 12b in the outlet 12a of the filling unit 12 is directly adjacent to such top face of the cylinder 25. The same holds true for the discharge opening 11b.

The operation of the apparatus will be described with reference to FIGS. 1 to 7 and with reference to FIG. 8 which illustrates various stages in the assembly of a filter tip or filter mouthpiece 68. The flutes 2a of the drum 2 furnish empty prefabricated tubes 1 into successive receptacles of the cylinder 25, namely, into successive flutes 27. At the same time, the flutes 7a of the drum 7 deliver filter plugs 15 into the pockets 45 of successive holding levers 39 while such levers maintain the pockets 45 in registry with the corresponding metering chambers 36. The manner in which the tubes 1 in the flutes 27 register with filter plugs 15 in the pockets 45 is shown in FIG. 8 at B. FIG. 8 illustrates at A a prefabricated tube 1 after it enters one of the flutes 27 in the cylinder 25 of the assembly conveyor 6. When a freshly filled flute 27 moves beyond the transfer station between the conveyor 6 and supply drum 2, the cam 4 causes the corresponding supporting plunger 3 to move upwardly and to shift the tube 1 axially into the registering bore 26 of the cylinder 25. The plunger 3 then remains in raised position during travel of the respective tube 1 along the path S, i.e., while the tube travels past and beyond the cutters 8, 9 and filling units or magazines 11, 12. The displacing ram 46 which registers with a freshly transferred tube 1 moves downwardly while the plunger 3 moves upwardly and causes the registering filter plug 15 to move axially downwardly into the upper part of the metering chamber 36 so that a first plug section or filter 61 extends downwardly beyond the top face of the cylinder 25. This is shown in FIG. 8 at C. As the metering chamber 36 advances past the cutter 8, the latter severs the thus displaced plug 15 to separate the section or filter 61 from the remaining part 62 of the filter plug, such remaining part being accommodated in and held by the pocket 45 of the corresponding holding lever 39. This is shown in FIG. 3 and in FIG. 8 at D. It will be seen that the metering chamber 36 serves as a socket for the plug section or filter 61 during separation of such section from the remainder of the plug 15. During severing, the spring 52 lifts the corresponding displacing ram 46 while the follower 51 travels along an upwardly sloping portion of the face on the cam 47. As the cylinder 25 continues to rotate, the cam 42 pivots the holding lever 39 to the position shown in the left-hand portion of FIG. 2 and in FIG. 4 so that the remainder 62 of the freshly severed filter plug 15 is moved away from registry with the metering chamber 36. This is shown in FIG. 8 at E. In the next stage of a cycle, the ram 46 again moves downwardly and displaces the freshly severed section 61 from the metering chamber 36 into the lower end portion of the registering tube 1 so that the section 61 abuts against the top face of the corresponding supporting plunger 3 and seals the lower end of the tube. This is shown in FIG. 4 and in FIG. 8 at F.

The tube 1, with the first plug section 61 received in its lower end portion, then enters the region R below the discharge opening 12b of the filling unit or magazine 12 whereby the outlet 12a discharges granular filter material 53 which fills the corresponding metering chamber 36. The lower end of the chamber 36 is automatically sealed by the gate 63 which extends into the groove 37 of the cylinder 25. This is shown in FIG. 5 and in FIG. 8 at G. When the thus filled metering chamber 36 advances beyond the region R, the surplus of granular material 53 is stripped off by the outlet 12a which slides along the top face of the cylinder 25. Also, and when the metering chamber 36 moves beyond the gate 63, the metered quantity or charge 64 of granular material 53 descends into the tube 1 by gravity and fills such tube in the zone directly above the plug section 61.

The assembly conveyor 6 continues to rotate in a counterclockwise direction, as viewed in FIG. 1, and moves the tube 1 toward the cutter 9. Before the tube reaches the severing station which accommodates this cutter, the cam 42 causes the corresponding holding lever 39 to move the pocket 45 and the remaining part 62 of the filter plug 15 back into registry with the freshly evacuated metering chamber 36. This is shown in FIG. 8 at H. The cam 47 causes the ram 46 to move downwardly and to push a second section or filter 65 of the remainder 62 of the filter plug 15 into the metering chamber 36. The cutter 9 then severs the part 62 to separate the median section or filter 65 from an uppermost section or filter 66. The section 65 is of double unit length and each of the sections 61, 66 is of unit length. The severing step is shown in FIG. 6 and in FIG. 8, as at I. Thus, when the holding lever 39 moves beyond the cutter 9, its pocket 45 merely holds the topmost filter plug section 66. This holding lever is then caused to pivot so as to move the section 66 away from registry with the metering chamber 36 (FIG. 8, as at K) and the cam 47 causes the displacing ram 46 to descend and to push the filter plug section 65 into the central zone of the tube 1 so that the charge 64 of granular filter material 53 is confined between the sections 61 and 65 (see FIG. 8, as at L). While the section 65 penetrates into the tube 1, it removes from the metering chamber 36 and from the upper portion of the tube 1 any such particles of filter material 53 which failed to descend by gravity downstream of the gate 63. Thus, the charge 64 then contains an accurately determined amount of granular filter material. If the charge 64 contains compressible material, the length of the central plug section 65 is made greater so that the particles of the charge 64 are compressed in response to insertion of the section 65 into the median zone of the tube 1.

In the next step, the ram 46 is retracted upwardly by the spring 52 and the metering chamber 36 advances into registry with the discharge opening 11b of the filling unit or magazine 11, i.e., the partially filled tube 1 travels below the gate 54 and the latter seals the lower end of the chamber 36 so that this chamber is filled with granular material issuing from the outlet 11a. The holding lever 39 moves the topmost section 66 of the filter plug 15 away from registry with the metering chamber 36 before the latter enters the filling region P. This is shown in FIG. 8 at L and M. As the conveyor 6 continues to rotate about the shaft 21, the freshly filled metering chamber 36 moves beyond the region P and the outlet 11a removes the surplus of granular material by sliding along the top face of the cylinder 25. The thus obtained second charge 67 (FIG. 8, as at M) is then free to descend by gravity and to fill a zone of the tube 1 above the median filter plug section 65. When the freshly evacuated chamber 36 advances beyond the region P, the cam 42 causes the holding lever 39 to return the topmost plug section 66 into registry with the tube 1 and the cam 47 causes the ram 46 to descend so that the section 66 is introduced into the top part of the tube 1 and confines the charge 67 from above (see FIG. 8, as at N, and FIG. 7). The filter tip 68 is now completed. The agitator 55 shakes the cylinder 25 and hence the metering chamber 36 so that the granular material is condensed or compacted in the chamber 6 and thereupon in the tube 1 while the tube travels with the conveyor 6. This insures that the density of each charge 64 and/or 67 is the same or nearly the same.

The conveyor 6 continues to rotate and moves the freshly formed filter tip 68 toward the takeoff conveyor 14. During such travel, the spring 31 causes the plunger 3 to descend and the cam 47 causes the registering displacing ram 46 to descend at the same rate as the plunger 3. Thus, the filter tip 68 is caused to move downwardly so as to leave the bore 26 and to return into the flute 27 before it reaches the transfer station between the conveyors 6 and 14. This is shown in FIG. 7 and in FIG. 8, as at 0. The filter tip 68 is then automatically transferred into the adjoining flute 14a and is caused to rotate about the shaft 13 and past the rotary heating element 18. This heating element 18 is used when the filter plugs 15 and/or the tubes 1 are provided with narrow strips of adhesive (71 on the external surface of the plug 15 as shown in FIG. 9, or 72 on the internal surface of the tube 1 as shown in FIG. 10). Such adhesive is heated by the peripheral surface 18a of the heating element 18 and is thus caused to bond the sections or filters 61, 65, 66 to the internal surface of the tube 1 to prevent axial displacement of such sections during further processing of the filter tip 68 and/or during smoking. The adhesive can be applied to the internal surface of the tube 1 and/or to the peripheral surfaces of the sections 61, 65, 66, i.e., the external surfaces of filter plugs 15. It is preferred to rotate the heating element 18 at a peripheral speed which exceeds that of the takeoff conveyor 14 so that the surface 18 causes the finished filter tips 68 to rotate in their respective flutes 14a which insures proper heating of each adhesive strip 71 and/or 72.

The filter tips 68 can be assembled with tobacco rods in the customary way. As a rule, such filter tips are placed between pairs of axially spaced tobacco rods and are thereupon surrounded by adhesive-coated uniting bands to form with the corresponding tobacco rods filter cigarettes of double unit length. Each such filter cigarette of double unit length is then severed midway across the median filter plug section 65 to yield two filter cigarettes of unit length. However, it is equally possible to connect each filter tip 68 to a tobacco rod of unit length so that the mouthpiece of the resulting filter cigarette, filter cigar or filter cigarillo contains several charges of granular filter material. It is also possible to simplify the apparatus of FIGS. 1 to 7 so that it produces filter tips of unit length each of which contains a single charge of granular filter material, i.e., one of the filling units 11, 12 can be omitted or inactivated, one of the cutters 8, 9 can be removed and the supply conveyor 5 can furnish shorter filter plugs which, upon severing, merely yield a pair of filter plug sections (61 and 66) of unit length. The construction of the mechanism which moves the holding levers 39 and reciprocates the rams 46 is then altered accordingly. It is equally clear that the apparatus of my invention can be designed to produce filter tips of triple or even greater unit length. The apparatus then comprises a greater number of filling units and severing devices and the means for operating the holding levers and the rams 46 are redesigned accordingly.

It will be seen that the improved apparatus basically comprises three essential assemblies, namely, an assembly conveyor 6 which is provided with one or more receptacles 26–27 which accommodate and advance prefabricated tubes 1 sideways, a charging assembly which includes one or more filling units and the metering chamber or chambers and serves to supply a charge of granular filter material to the tubes in the receptacles 26–27 of the assembly conveyor, and a plugging assembly which includes the holding levers 39 and the rams 46 and serves to introduce into the tubes 1 in receptacles 26–27 entrainment-type air permeable filters (sections 61, 65, 66) prior and subsequent to admission of charges.

If the filter plug sections 61 (or analogous air-permeable filters) are introduced into or otherwise installed in the tubes 1 prior to transfer of such tubes into the flutes 27 of the assembly conveyor 6, the plugs 15 are shorter because each such plug must yield only two sections, namely, the sections 65, 66.

FIG. 11 illustrates a portion of a slightly modified apparatus. Certain parts of this apparatus are denoted by numerals similar to those employed in FIGS. 1 to 7, plus 200. The assembly conveyor 206 differs from the assembly conveyor 6 of FIGS. 1 to 7 mainly in that the agitator 55 and the slip rings 56 are dispensed with and that the conveyor 206 is provided with suction generating means to promote the flow of granular filter material into the interior of prefabricated tubes 201. The cam 242 for the holding levers 239 has a cylindrical portion or core 242a which is mounted on the base 219 and is provided with a disk-shaped flange 265 which supports two casings 287 (only one shown) each located at one of the filling regions corresponding to the regions P, R shown in FIG. 1. Each of these casings 287 is movable radially of the shaft 221 and each thereof has a recess 286 which faces the cylinder 225 and accommodates a shoe 288. A spring 285 is interposed between each casing 287 and the flange 265 to bias the shoes 288 radially outwardly against the internal surface of the cylinder 225. Such internal surface is provided with a projection or rib 284 which is engaged by the shoes 288. Each shoe 288 has a port 289 which is adjacent to the rib 284 and extends circumferentially from the region P or R to the point where the tube 201 receives the filter plug section 65 or 66. Each port 289 is connected with a suction generating device (not shown). Each flute 227 of the cylinder 225 communicates with a radial port 292 and each supporting plunger 283 has a downwardly extending axial blind bore 293 which communicates with a radial bore 294. The radial bores 294 of successive plungers 283 register with the adjoining radial port 292 (and hence with one of the elongated ports 289) when the plunger 283 assumes its upper end position shown in FIG. 11.

The operation of the apparatus which embodies the conveyor 206 of FIG. 11 is analogous to that of the previously described apparatus. When the granular filter material enters a tube 201, suction in the axial bore 293 of the corresponding supporting plunger 283 enhances the flow of granular material into the tube. Such granular material cannot penetrate into the bore 293 because the latter's intake end is adjacent to the underside of the lowermost filter plug section 61. Such plug section 61 is permeable to air and the same holds true, of course, for the median filter plug section 65 through which the bore 293 of the plunger 283 draws air when the tube 201 receives the second charge corresponding to the charge 67 shown in FIG. 8 at N. The purpose of air currents induced by suction in the bores 293 is to assist and to accelerate the entry of granular filter material into the tubes 201.

Figure 12:
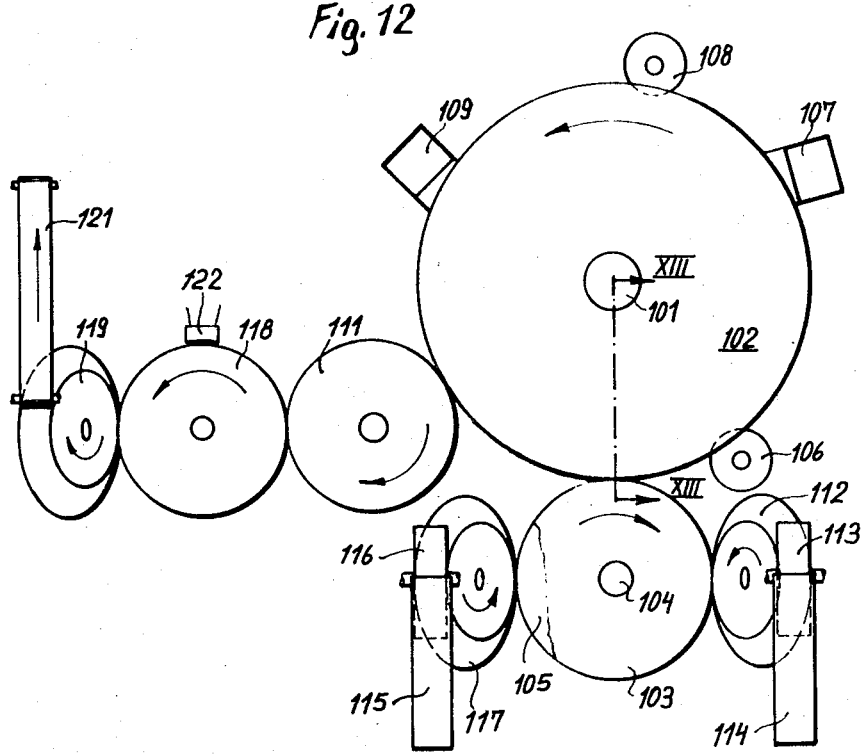
FIG. 12 is a diagrammatic top plan view of a third apparatus.
Figure 13:
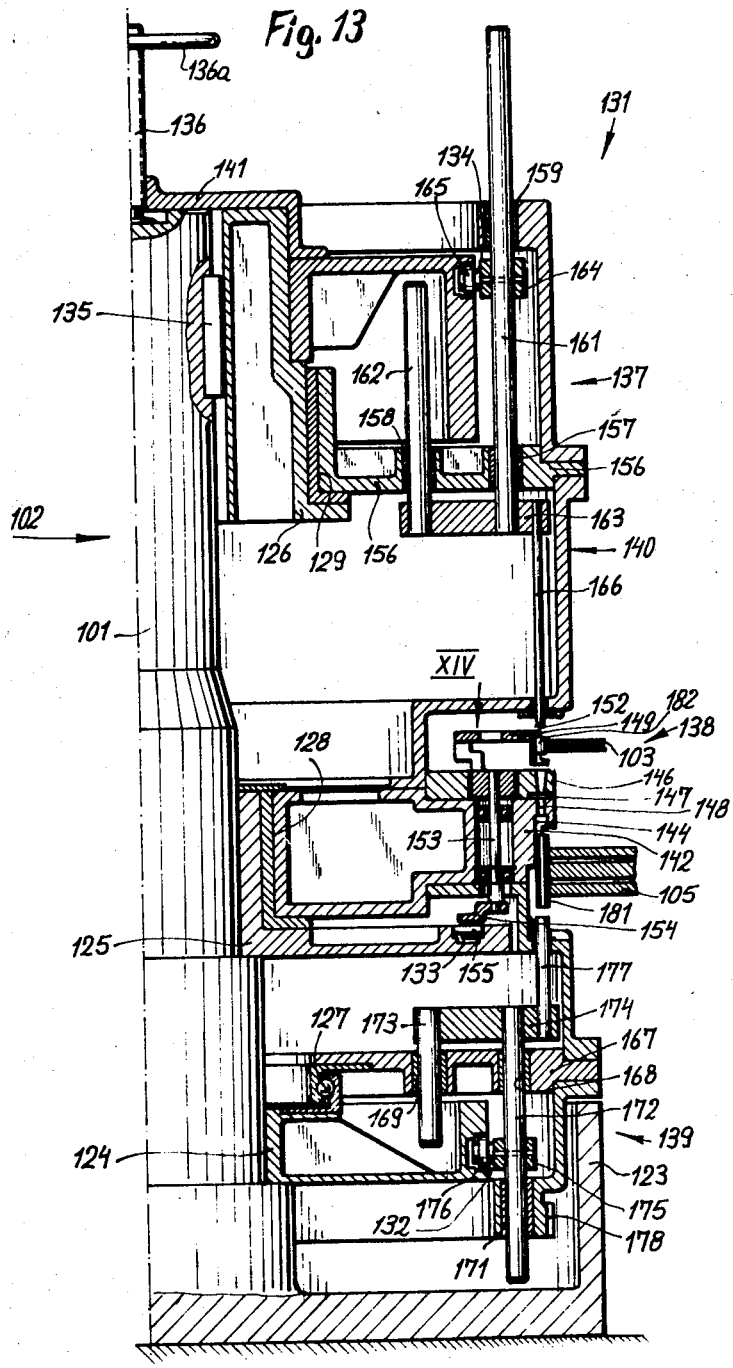
FIG. 13 is an enlarged fragmentary vertical sectional view as seen in the direction of arrows from the line XIII—XIII of FIG. 12.

FIGS. 12 to 14 illustrate a third apparatus. The assembly conveyor 102 of this apparatus is rotatable about a vertical axis defined by a shaft 101. A first supply conveyor 105, here shown as a fluted drum of wheel, delivers empty prefabricated tubes 181 and a similar second supply conveyor 103 delivers filter plugs 182. The conveyors 103, 105 are rotatable about a common vertical axis defined by a shaft 104. The assembly conveyor 102 rotates in a counterclockwise direction, as viewed in FIG. 12, and moves the tubes 181 past a first rotary cutter 106, thereupon past a first filling unit or magazine 107, a second rotary cutter 108, a second filling unit or magazine 109 and on to a takeoff conveyor 111. The conveyor 111 is fluted and rotates about a vertical axis. The cutters 106, 109 also rotate about vertical axes. The takeoff conveyor 111 delivers finished filter tips to an intermediate conveyor 118.

The supply conveyor 103 receives filter plugs 182 from a frustoconical transfer conveyor 112 rotatable about an axis which makes an angle of 45° with the axis of the shaft 104. The flutes of the conveyor 112 are provided in its conical peripheral surface so that such flutes are vertical at the station where they transfer filter plugs 182 to the flutes of the supply conveyor 103, but are horizontal at the station where they receive filter plugs from a withdrawing conveyor 113 which is rotatable about a horizontal axis and whose axially parallel flutes receive filter plugs 182 from the discharge end of a magazine 114.

The means for delivering empty tubes 181 to the flutes of the supply conveyor 105 is of similar design. It comprises a frustoconical transfer conveyor 117 whose axis makes an angle of 45° with the axis of the shaft 104 so that its flutes are vertical at the transfer station between the conveyors 105, 117 but extend horizontally at the transfer station where the conveyor 117 receives tubes 181 from a withdrawing conveyor 116. The latter is rotatable about a horizontal axis and has axially parallel flutes which receive empty tubes 181 from the discharge end of a magazine 115.

A further frustoconical transfer conveyor 119 is adjacent to and receives finished filter tips from the intermediate conveyor 118. The flutes of the transfer conveyor 119 are horizontal at the station where they deliver finished filter tips to the receiving end of an endless belt 121 which delivers a layer of filter tips to a filter cigarette machine, to storage or to another destination.

The intermediate conveyor 118 has a peripheral surface provided with narrow axially parallel ribs which extend between a succession of convex rolling surfaces. Finished filter tips adhere to such rolling surfaces by suction and are caused to roll during travel past a stationary rolling member 122 which is heated and whose function is the same as that of the heating element 18 shown in FIG. 1. The length of rolling surfaces between the ribs of the intermediate conveyor 118 at least equals but preferably exceeds, at least slightly, the circumferential length of a tube 181. The length of the heated surface on the rolling member 122 equals the length of a rolling surface on the intermediate conveyor 118.

FIG. 13 shows the assembly conveyor 102 in partial axial section and further illustrates the transfer stations where the conveyor 102 receives empty tubes 181 and filter plugs 182 from supply conveyors 105, 103. The shaft 101 is mounted in a stationary frame or base 123 and has close to its lower end an annular shoulder which supports a first carrier 124 which is rigid with one race of an antifriction bearing 127. The radially outermost part of the carrier 124 constitutes a cylinder cam having a circumferential cam groove 132.

A second carrier 125 is mounted on a second shoulder of the shaft 101 at a level above the carrier 124 and supports a bearing sleeve 128. The outermost part of the carrier 125 also constitutes a cam whose top face is formed with an endless cam groove 133. A third carrier 126 is mounted at the upper end of the shaft 101 and comprises a central portion 141 which normally abuts against the top face of this shaft. A key 135 holds the carrier 126 against rotation with reference to the shaft 101. A threaded spindle 136 meshes with the central portion 141 of the carrier 126 so that its lower end abuts against the top face of the shaft 101. When the spindle 136 is rotated by a hand wheel 136 or the like, the carrier 126 is caused to move up or down but cannot rotate with reference to the shaft 101. The outermost part of the carrier 126 constitutes a cylindrical cam having a peripheral cam groove 134. The carrier 126 further supports a bearing sleeve 129. It will be noted that the carrier 126 cannot rotate on the shaft 101, and the same applies for the carriers 124, 125.

The aforementioned antifriction bearing 127 and bearing sleeves 128, 129 rotatably support a drum body 131 which corresponds substantially to the drum body 22 shown in FIG. 1. The body 131 comprises an upper portion 137, a median portion 138 and a lower portion 139. These portions 137-139 are connected to each other and form parts of a composite cylindrical shell 140 which is assembled of several coaxial annuli. The median portion 138 is mounted at a level directly above the cam groove 133 of the median carrier 125 and forms an integral part of the aforementioned shell 140. That part of the shell 140 which constitutes the median portion 138 is denoted by the numeral 142 and is supported by the bearing sleeve 128. The part 142 is provided with axially parallel receptacles 144 each of which includes a lower portion or flute and an upper portion or bore (respectively corresponding to a flute 27 and a bore 26 of a receptacle in the cylinder 25 shown in FIG. 2).

Each receptacle 144 registers with an upwardly extending duct 148, and each such duct is adjacent to the lower end of a vertical metering chamber 146. Each metering chamber 146 tapers slightly downwardly, i.e., in a direction toward the registering duct 148 and receptacle 144. A narrow circumferential groove 147 which is machined into the part 142 of the shell 140 separates each duct 148 from the registering metering chamber 146. Stationary gates extend into the groove 147 in the regions where the metering chambers 146 receive granular filter material from the filling units or magazine 107 and 109. The cutters 106, 108 are located in a plane which is immediately adjacent to the upper ends of the metering chambers 146.

A pocket 149 can be moved into registry with each metering chamber 146 during certain stages of rotation of the drum body 131 about the axis of the shaft 101. The pockets 149 are slightly spaced from the upper ends of the metering chambers 146 and serve to temporarily support filter plugs 182 or sections of such filter plugs. Each pocket 149 has a flutelike upper portion and a borelike lower portion. Four successive pockets are provided on a common holding member or lever 152 (see particularly FIG. 14) and such levers are amounted on vertical pivot members 153 which are installed in the part 142 of the shell 140. The pivot members 153 are rigid with the respective levers 152 and their lower ends are fixedly connected with arms 154 which carry roller followers 155 extending into the cam groove 133.

A ring-shaped guide 156 is secured to the shell 140 by screws or analogous fasteners and surrounds the bearing sleeve 129. The guide 156 is formed with pairs of vertical bores 157, 158 whose axes are located in a radial plane of the drum body 131. Such radial planes intersect the axis of each fifth pocket 149. Each outer bore 157 registers with a bore 159 provided in a collar at the upper end of the portion 137. Two guide rods 161, 162 are respectively fitted into the bores 157, 159 and 158. The lower ends of the rods 161, 162 carry a support 163 for vertical displacing rams 166. Each outer guide rod 161 is fixed to an arm 164 for a roller follower 165 which extends into the cam groove 134. Each of the rams 166 registers with one of the receptacles 144. The lower end portions of the rams 166 are guided in bores which are provided in a horizontally extending collar of the shell 140 at a level above the pockets 149. The rams 166 are guided in such bores with a minimum of clearance to prevent entry of dust or other foreign matter.

The lower portion 139 of the drum body 131 is also provided with a ring-shaped guide 167 which is fixed to the other race of the antifriction bearing 127 and to the shell 140. The guide 167 has pairs of bores 168, 169 and each outer bore 168 registers with a bore 171 provided in lowermost component of the portion 139. The bores 168, 171 and 169 respectively accommodate guide rods 172, 173 whose upper ends are secured to supports 174 for set or groups of four vertical supporting plungers 177 each of which registers with one of the receptacles 144. Each guide rod 172 carries an arm 175 for a roller follower 176 which extends into the cam groove 132.

The lower end portion of the shell 140 is provided with an external gear 178 which forms part of the drive for the drum body 131. This gear receives torque by way of a suitable transmission which is not shown in the drawing and corresponds to the transmission including the parts 33-35 illustrated in FIG. 2.

FIG. 14 illustrates the aforementioned pockets 149, the holding members 152 which are provided with such pockets, and the cutter 106. The holding members 152 are suitably curved to insure that they do not interfere with each other during pivotal movement about the axes of the respective pivot members 153.

The operation of the apparatus shown in FIGS. 12 to 14 is as follows:

The magazine 115 receives and contains a supply of empty prefabricated tubes 181. The discharge end of the magazine 115 supplies tubes 181 to the flutes of the withdrawing conveyor 116 which admits tubes into successive flutes of the transfer conveyor 117. The latter delivers tubes into the flutes of the supply conveyor 105 which delivers such tubes into consecutive receptacles 144 of the drum body 131.

The magazine 114 accommodates a supply of filter plugs 182 which are delivered to the flutes of the withdrawing conveyor 113. The latter feeds plugs 182 into the flutes of the transfer conveyor 112 which delivers them to the flutes of the supply conveyor 103. Such plugs are admitted into the pockets 149 of successive holding members 152. The material of the filter plugs 182 may consist of cellulose or acetate fibers, of foamed material which has open cells to permit the passage of air and smoke, or of any other entrainment-type material which is useful in the manufacture of filter plugs. The passages defined by the plugs 182 must be so small that they prevent escape of granular filter material but do not offer excessive resistance to the passage of smoke. The conveyors 103, 105, 112, 113, 116, 117, 111, 118, 119 are suction conveyors. However, the assembly conveyor 102 is preferably associated with suitable arcuate shields or shrouds (corresponding to the shrouds 16, 17 or 20 shown in in FIG. 1) so that tubes 181 travelling with the conveyor 102 are held against the action of centrifugal force by mechanical means. Such shrouds extend from a point immediately downstream of the transfer station between the conveyors 102 and 103, 105 to a point upstream of the takeoff conveyor 111. Additional shrouds are preferably provided to cooperate with the holding members 152 so as to properly retain the filter plugs 182 in the pockets 149. When a group of four freshly delivered tubes 181 moves away from the transfer station between the conveyors 102, 105, the corresponding guide rods 172, 173 begin to move the support 174 upwardly to lift four supporting plungers 177 whereby such plungers lift the upper portions of the four tubes 181 from the flutes into the bores of the receptacles 144. The plungers 177 then remain in such raised positions until after completed assembly of four filter tips. At the same time, the upper guide rods 161, 162 cause the support 163 to move the corresponding displacing rams 166 downwardly to push four filter plugs 182 through the annular portions of the pockets 149 so that the lowermost sections of such filter plugs penetrate into the registering metering chambers 146. The thus displaced plugs 182 travel past the cutter 106 which severs them at a level directly above the upper ends of the metering chambers 146. In the next step, the displacing rams 166 are lifted slightly above the remaining parts of the severed filter plugs 182 and the corresponding holding lever 152 is caused to pivot about the axis of the member 153 to the position shown for the upper two holding levers of FIG. 14. Thus, the remaining parts of the plugs 182 are moved away from registry with the corresponding metering chambers 146. As soon as the pockets 149 are moved out of the way, the displacing rams 166 are caused to descend and to push the freshly severed filter plug sections (corresponding to the section 61 of FIG. 8), into the lower end portions of the corresponding tubes 181. The rams 166 are thereupon returned to their upper end positions before the tubes 181 (with the filter plug sections therein) reach the first filling unit 107. The outlet of this filling unit has a discharge opening located immediately above the upper ends of the metering chambers 146. One of the aforementioned gates extends into the circumferential groove 147 below the lower ends of those metering chambers 146 which advance past the discharge opening of the filling unit 107 so that the gate intercepts granular filter material which is discharged by the unit 107 and that each metering chamber is filled to capacity. The gate preferably extends a little beyond the discharge opening of the filling unit 107. Surplus granular material which piles up to a level above the upper ends of the metering chambers 146 is swept away by the outlet of the filling unit 107 so that each of these chambers contains an accurately metered charge of such material. The contents of the thus filled metering chambers 146 are evacuated by gravity when the chambers move beyond the gate and the granular material descends into the corresponding tubes 181. The holding lever 152 is thereupon caused to return its four pockets 149 into registry with the partially filled tubes 181 and the rams 166 are caused to descend so that they push portions of the remaining parts of the filter plugs 182 into the corresponding metering chambers 146. The plugs are thereupon severed during travel past the cutter 108 so that each thereof yields a relatively long lower section (corresponding to the section 65 of FIG. 8) which is accommodated in the corresponding metering chamber and a relatively short upper section (corresponding to the section 66 of FIG. 8) which remains in the corresponding pocket 149. The levers 152 are then pivoted again so as to move their pockets 149 away from registry with the metering chambers 146 before such chambers reach the discharge opening in the outlet of the second filling unit 109. However, even before the metering chambers 146 reach the filling unit 109, the rams 166 are caused to descend and to transfer the relatively long filter plug sections from the metering chambers into the corresponding tubes 181 so that such sections form seals at the upper ends of charges which were admitted by the filling unit 107. The metering chambers 146 are filled during travel past the filling unit 109 while the second stationary gate extends into the groove 147 to seal the metering chambers from below. The charges accumulating in the chambers 146 are allowed to descend into the corresponding tubes 181 when the chambers move beyond the gate in the groove 147. The holding lever 152 then returns the pockets 149 into registry with the metering chambers 146 and the rams 166 descend to transfer the short filter plug sections from the pockets into the upper ends of the tubes 181 to thus complete the formation of four filter tips.

If the filter material which is stored in the filling units 107, 109 is compressible, the metering chambers 146 are dimensioned in such a way that they accumulate charges which occupy more room than allotted therefor in the tubes 181. Such charges are compacted by filter plug sections which are transferred into the tubes 181 above the lower and upper charges.

When the assembly of four filter tips is completed (downstream of the filling unit 109), the rams 166 are caused to move downwardly in synchronism with the plungers 177 so that the filter tips are expelled from the upper portions or bores of the receptacles 144 and are ready to be transferred into the flutes of the takeoff conveyor 111. The latter transfers the filter tips onto the convex rolling surfaces of the intermediate conveyor 118 which advances the filter tips past the heated rolling member 122 which causes the filter tips to turn and to be heated from all sides for the purpose which was explained in connection with FIGS. 9 and 10. The arrangement is preferably such that each filter tip completes a full revolution about its own axis during travel past the rolling member 122. The heating action of the member 122 suffices to activate the adhesive which is applied to the internal surfaces of the tubes 181 and/or to the external surfaces of filter plugs 182 so that the adhesive provides a satisfactory bond between the tubes and the corresponding filter plug sections during cooling which follows the heating step at the station accommodating the member 122.

The conveyor 118 delivers filter tips to the flutes of the transfer conveyor 119 which discharges successive filter tips onto the upper stretch of the belt 121. The latter transports the filter tips sideways. Suitable guides may be provided at the transfer station between the conveyor 119 and the belt 121.

When it becomes necessary to clean the metering chambers 146 in the drum body 131, the top portion of the shell 140 is disconnected from the remaining part of the shell and the spindle 136 is rotated by way of the wheel 136a to lift the entire carrier 126 with the cam groove 134, guide rods 161, 162, supports 163 and rams 166. The metering chambers 146 are then accessible from above.

Figure 15:
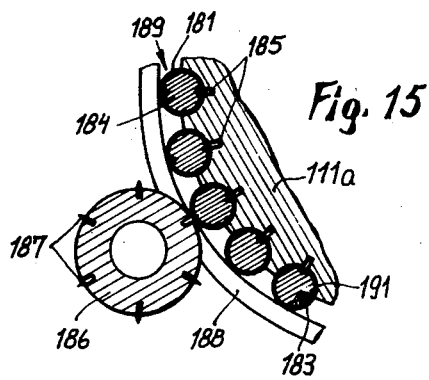
FIG. 15 is a fragmentary horizontal sectional view of a detail in a fourth apparatus.

FIG. 15 shows a portion of a modified takeoff conveyor 111a which can be utilized in the apparatus of FIGS. 12 to 14 as a substitute for the conveyor 111. The conveyor 111a is provided with needles or analogous projections 185 which extend radially outwardly into peripheral flutes 191. Each flute 191 receives the tips of three needles 185 each of which is located at the level of one of the three filter plug sections 184 in a finished filter tip 189. The conveyor 111a cooperates with a roller 186 which is provided with sets of vertically aligned projections or needles 187 and is driven in synchronism with the takeoff conveyor so that a set of needles 187 is located diametrically opposite a set of needles 185 when a finished filter tip 189 passes through the gap between the conveyor 111a and the roller 186. The filter tips 189 are held in the flutes 191 by arcuate shrouds 188.

The needles 185, 187 puncture each tube 181 at six points, twice in the region of each filter plug section 184. At the same time, the needles 185, 187 deform the material of the tubes 181 and cause it to penetrate into the material of such filter plug sections to thus provide a mechanical connection between the tubes and the sections. In this way, the charges 183 in the tubes 181 are properly confined and their volume cannot change during subsequent treatment of filter tips 189. When the filter plugs 189 are thereupon assembled with tobacco rods to form filter cigarettes, filter cigarillos or filter cigars, the adhesive-coated uniting bands which are applied around the filter tips and around the adjoining end portions of the tobacco rods overlie the perforations formed by the needles 185, 187 to prevent entry of air. Moreover, adhesive which is applied to each such uniting bands penetrates into the perforations and provides a bond between the tubes 181 and the filter plug sections 184 therein so that the sections are secured to the tubes not only mechanically but are also bonded thereto by means of an adhesive.

Due to the fact that the improved apparatus admits granular filter material through one end of a prefabricated tube rather than into pockets defined by a U-shaped web with axially spaced filter plug sections, the compartments which are intended to receive the charges of granular filter material can be filled to capacity, with a high degree of uniformity and without the formation of air pockets which could permit the smoke to bypass the granular material. By changing the size of the metering chambers and/or by changing the strokes of the displacing rams, one can produce filter tips wherein the charges occupy a desired amount of space and wherein the granules of such charges are compacted or condensed to a desired degree. The apparatus can produce filter tips wherein the charges of granular filter material occupy by far the largest part of the interior of a prefabricated tube.

In the claims, the definition "filter" is intended to embrace sections of filter rods or filter plugs and analogous filters of solid entrainment-type filter material. The term "granular filter material" is intended to embrace powdery substances as well as coarse and fine granules.

What is claimed as new and desired to be protected by Letters Patent is set forth in the appended claims.

1. Apparatus for the production of filter tips which are attachable to wrapped rodlike tobacco fillers and wherein at least one charge of granular filter material is confined between gas-permeable entrainment-type filters, comprising conveyor means having at least one continuously moving receptacle for accommodating and advancing a prefabricated tube sideways; charging means for introducing a charge of granular filter material into the tube in said receptacle; and plugging means for introducing into the tube in said receptacle at least one filter so that the thus introduced filter fixes the position of the charge with reference to one end of the tube in said receptacle, said plugging means comprising continuously moving filter displacing means registering with said receptacle.

2. Apparatus as defined in claim 1, wherein said conveyor means is arranged to advance one end of the tube in said receptacle along a predetermined path and wherein said charging means comprises metering means adjacent to said path in registry with said one end of the tube in said receptacle and filling means for supplying granular material to said metering means.

3. Apparatus as defined in claim 2, wherein said metering means is arranged to share the movements of said receptacle.

4. Apparatus as defined in claim 3, wherein said conveyor means comprises a plurality of receptacles and wherein said charging means comprises a plurality of metering means each of which registers with one of said receptacles.

5. Apparatus as defined in claim 2, wherein said metering means comprises a chamber and said filling means comprises a magazine having an outlet which communicates with said chamber during a portion of movement of the receptacle and chamber along said path.

6. Apparatus as defined in claim 5, wherein said chamber is a bore, one end of which is adjacent to but spaced from the one end of the tube in said receptacle and further comprising means for sealing said one end of said bore during said portion of movement of said chamber along said path so that the charge of material entering said chamber is temporarily retained therein.

7. Apparatus as defined in claim 6, wherein said sealing means comprises a stationary gate.

8. Apparatus as defined in claim 5, wherein said charging means further comprises a duct located between said chamber and said one end of the tube in said receptacle.

9. Apparatus as defined in claim 1, wherein said plugging means further comprises means for moving said displacing means axially of the tube in said receptacle toward and away from said receptacle.

10. Apparatus as defined in claim 9, wherein the means for moving said displacing means comprises cam means and follower means tracking said cam means and arranged to move said displacing means in response to movement of said displacing means with said receptacle.

11. Apparatus as defined in claim 10, further comprising means for moving said displacing means and said cam means axially of the tube in said receptacle.

12. Apparatus as defined in claim 1, wherein said plugging means is mounted on said conveyor means.

13. Apparatus as defined in claim 1, wherein said plugging means further comprises holder means for filters and means for moving the filters in said holder means into and away from registry with the tube in said receptacle.

14. Apparatus as defined in claim 13, wherein said holder means is mounted on said conveyor means and wherein the filters in said holder means are movable at right angles to the axis of the tube in said receptacle.

15. Apparatus as defined in claim 13, wherein said conveyor means comprises a plurality of receptacles each arranged to accommodate and to advance a prefabricated tube and wherein said holder means comprises means for simultaneously maintaining filters in registry with tubes in a group of said receptacles.

16. Apparatus as defined in claim 13, wherein said conveyor means comprises a plurality of receptacles each arranged to accommodate and to advance a prefabricated tube and wherein said holder means comprises discrete holders, one for each of said receptacles.

17. Apparatus as defined in claim 13, wherein said displacing means is arranged to move filters from said holder means into a tube in said receptacle and said holder means is arranged to place the filters into registry with the tube in said receptacle intermediate said receptacle and said displacing means.

18. Apparatus as defined in claim 13, wherein said holder means comprises pocket means for filters and wherein said pocket means is coaxial with the tube in said receptacle when a filter therein registers with the tube in said receptacle.

19. Apparatus as defined in claim 18, wherein at least a portion of said pocket means is of circular shape.

20. Apparatus as defined in claim 1, wherein said conveyor means comprises a group of continuously moving receptacles each of which is arranged to accommodate and advance a prefabricated tube sideways and said charging means comprises means for admitting a charge of granular filter material into a tube in each of said receptacles, said plugging means comprising a plurality of continuously moving displacing means each registering with one of said receptacles and said plugging means further comprising means for simultaneously moving all of said displacing means with reference to the corresponding receptacles.

21. Apparatus as defined in claim 1, wherein said plugging means is mounted on said conveyor means and said charging means comprises metering means registering with the tube in said receptacle and disposed between said receptacle and said plugging means.

22. Apparatus as defined in claim 1, wherein said conveyor means comprises an endless conveyor and means for continuously driving said endless conveyor.

23. Apparatus as defined in claim 1, wherein at least a portion of said receptacle is circular.

24. Apparatus as defined in claim 1, wherein said charging means is arranged to introduce the charge through one end of the tube in said receptacle and further comprising means for supporting the other end of the tube in said receptacle.

25. Apparatus as defined in claim 24, wherein said supporting means comprises a plunger which is coaxial with the tube in said receptacle and means for moving said plunger axially.

26. Apparatus as defined in claim 1, wherein said conveyor means comprises a drum which is rotatable about a vertical axis.

27. Apparatus as defined in claim 1, further comprising pneumatic means for assisting the admission of charge into the tube in said receptacle.

28. Apparatus as defined in claim 2, wherein said pneumatic means comprises means for producing suction in the tube in said receptacle.

29. Apparatus as defined in claim 1, further comprising means for agitating the charge, at least upon admission of such charge into the tube in said receptacle.

30. Apparatus as defined in claim 1, further comprising means for deforming the tube subsequent to introduction of said charge and said filter in the region of the filter therein.

31. Apparatus as defined in claim 30, wherein said deforming means comprises needle means.

32. Apparatus as defined in claim 30, further comprising takeoff conveyor means for receiving the tube from said first mentioned conveyor means, at least a portion of said deforming means being provided on said takeoff conveyor means.

33. Apparatus as defined in claim 1, further comprising means for heating the tube subsequent to introduction of at least one filter.

34. Apparatus as defined in claim 1, wherein said conveyor means comprises an endless conveyor arranged to orbit said receptacle about a vertical axis so that the axis of the tube in said receptacle is vertical.

35. Apparatus for the production of filter tips of the type wherein at least one charge of granular filter material is confined in a tube between gas-permeable entrainment-type filters, comprising an endless conveyor having a plurality of equidistant receptacles for accommodating and advancing prefabricated tubes sideways, said conveyor being arranged to orbit said receptacles about a vertical axis so that the axes of tubes in said receptacles are vertical; charging means for introducing charges of granular filter material into the tubes in said receptacles, said charging means comprising a metering chamber provided on said conveyor in registry with each of said receptacles; and plugging means for introducing into the tubes in said receptacles filters prior and subsequent to admission of said charges, said plugging means comprising holder means provided on said conveyor and having means for temporarily supporting filters therein, means for moving said holder means to place the filters therein into and out of registry with tubes in said receptacles, and displacing means provided on said conveyor for transferring filters from said holder means into the tubes in said receptacles.

36. Apparatus as defined in claim 35, further comprising means for simultaneously operating groups of said displacing means.

37. Apparatus as defined in claim 35, wherein said holder means comprises discrete holders for groups of filters.

38. Apparatus as defined in claim 35, further comprising means for severing the filters in said holder means.

39. Apparatus as defined in claim 35, wherein said charging means further comprises at least one source of granular filter material adjacent to the path of movement of said metering means to admit granular filter material into successive metering means in response to movement of said metering means about said axis.